United States Patent
Bordin et al.

(10) Patent No.: US 11,498,869 B2
(45) Date of Patent: Nov. 15, 2022

(54) PALE-COLORED FIBER CEMENT PRODUCTS AND METHODS FOR THE PRODUCTION THEREOF

(71) Applicants: ETEX SERVICES NV, Kapelle-op-den-Bos (BE); COMPTOIR DU BATIMENT NV, Kapelle-op-den-Bos (BE)

(72) Inventors: Ruben Bordin, Mechelen (BE); Dave Verleene, Deurne (BE); Jan Kerstens, Kapellen (BE)

(73) Assignees: Etex Services NV, Kapelle-op-den-Bos (BE); Comptoir Du Batiment NV, Kapelle-op-den-Bos (BE)

( * ) Notice: Subject to any disclaimer, the term of this patent is extended or adjusted under 35 U.S.C. 154(b) by 368 days.

(21) Appl. No.: 16/498,180

(22) PCT Filed: Mar. 27, 2018

(86) PCT No.: PCT/EP2018/057774
§ 371 (c)(1),
(2) Date: Sep. 26, 2019

(87) PCT Pub. No.: WO2018/178079
PCT Pub. Date: Oct. 4, 2018

(65) Prior Publication Data
US 2021/0101831 A1    Apr. 8, 2021

(30) Foreign Application Priority Data

Mar. 28, 2017    (EP) ..................................... 17163339

(51) Int. Cl.
*C04B 16/06*        (2006.01)
*C04B 14/02*        (2006.01)
(Continued)

(52) U.S. Cl.
CPC ........ *C04B 16/0633* (2013.01); *C04B 14/022* (2013.01); *C04B 14/28* (2013.01);
(Continued)

(58) Field of Classification Search
CPC ... C04B 16/0633; C04B 14/022; C04B 14/28; C04B 14/305; C04B 14/308; C04B 20/0068; C04B 28/02
See application file for complete search history.

(56) References Cited

U.S. PATENT DOCUMENTS 4,036,839 A  *  7/1977  Plunguian ........... C04B 41/5076
                                                        264/DIG. 57
2002/0160174 A1*  10/2002  Nanko .................... C04B 18/24
                                                        156/276
(Continued)

FOREIGN PATENT DOCUMENTS

CN    101 955 343 A       1/2011
CN    105272026 A  *   1/2016  ............. C04B 28/04
(Continued)

OTHER PUBLICATIONS

English machine translation of CN 105272026A (Year: 2016).*
(Continued)

*Primary Examiner* — John E Uselding
(74) *Attorney, Agent, or Firm* — Dilworth & Barrese, LLP (57) ABSTRACT

The present invention relates to pale-colored fiber cement products at least comprising white cement and synthetic fibers, wherein the synthetic fibers are pigmented with at least one dark pigment chosen from the group consisting of a black pigment, a brown pigment, a blue pigment, a red pigment, a green pigment and a gray pigment. The present invention further relates to methods for the production of
(Continued)

these pale-colored fiber cement products as well as to uses thereof in the building industry.

20 Claims, 4 Drawing Sheets

(51) Int. Cl.
*C04B 14/28* (2006.01)
*C04B 14/30* (2006.01)
*C04B 20/00* (2006.01)
*C04B 28/02* (2006.01)
*C04B 111/80* (2006.01)

(52) U.S. Cl.
CPC .......... *C04B 14/305* (2013.01); *C04B 14/308* (2013.01); *C04B 20/0068* (2013.01); *C04B 28/02* (2013.01); *C04B 2111/802* (2013.01)

(56) References Cited

U.S. PATENT DOCUMENTS

| | | | |
|---|---|---|---|
| 2005/0284339 A1* | 12/2005 | Brunton | E04D 1/30 106/713 |
| 2009/0311505 A1* | 12/2009 | Tanaka | E04F 13/16 428/221 |
| 2015/0274593 A1* | 10/2015 | Jesus De Sequeira Serra Nunes | C04B 28/04 252/301.36 |

FOREIGN PATENT DOCUMENTS

| | | |
|---|---|---|
| EP | 2 172 434 A1 | 4/2010 |
| JP | H10-12871 A | 1/1998 |
| JP | H11-129225 A | 5/1999 |
| WO | 2016/202680 A1 | 12/2016 |

OTHER PUBLICATIONS

Broda, "Application Of Polypropylene Fibrillated Fibres for Reinforcement of Concrete and Cement Mortars," High Performance Concrete Technology and Applications, Oct. 5, 2016, pp. 189-204.
Pietsch, "Pigmentation of Polypropylene," Polypropylene, Polymer Science and Technology Series, vol. 2, 1999, pp. 591-592.
Madhavi et al., "Polypropylene Fiber Reinforced Concrete—A Review," International Journal of Emerging Technology and Advanced Engineering, vol. 4, No. 4, Jun. 4, 2014, pp. 114-119.
"Colouring Mortar and Concrete Productions," Jul. 2013, pp. 1-24.
"Mixing Fibre Reinforced Concrete," Dec. 31, 2016.

* cited by examiner

PALE-COLORED FIBER CEMENT PRODUCTS AND METHODS FOR THE PRODUCTION THEREOF

FIELD OF THE INVENTION

The present invention relates to pale-colored fiber cement products. The present invention further relates to methods for the production of these pale-colored fiber cement products as well as to uses thereof in the building industry.

BACKGROUND OF THE INVENTION

Pale-colored or white-colored fiber cement products are known in the art. Obtaining the white color is achieved either by using white cement as a basic component or by coating ordinary gray fiber cement-based products with a white-colored paint. The latter way is most commonly applied because it is simple to do, less expensive compared to the use of white cement, and because it allows to obtain any desired white color shade.

SUMMARY OF THE INVENTION

The present inventors have now developed new and inventive pale-colored fiber cement products at least comprising white cement and synthetic fibers. The pale-colored fiber cement products of the present invention are esthetically appealing and have very good mechanical and physical properties. More specifically, the fiber cement products of the present invention at least comprise white cement and synthetic fibers, wherein the synthetic fibers are pigmented with at least one dark pigment chosen from the group consisting of a black pigment, a brown pigment, a red pigment, a green pigment and a gray pigment.

While developing the new fiber cement products, the inventors have found that it is essential to color the synthetic fibers with a pigment, rather than applying a dye or an ink. In fact, dark-colored fibers stained with a dye or an ink, proved to be unsuitable for the production of the pale-colored fiber cement products of the present invention. It was observed by the present inventors that after incorporating dye-stained or ink-stained fibers in the fiber cementitious products, the dye or ink caused bleeding effects and stains throughout the white cementitious matrix or, in other cases, the fibers simply completely lost their color and as a result also their visibility. Without being bound to any hypothesis or theory, the inventors believe that the aqueous alkaline environment of the cementitious matrix causes an alteration in the chemical structure of the specific dye (or ink), thereby breaking the chemical bond between the dye (or ink) and the fiber or thereby causing a decolorization.

Accordingly, the inventors looked for a solution to solve the above problems and have surprisingly found that when using a pigment to color the synthetic fibers, the bleeding or decoloring issues did not occur.

The resulting pale-colored fiber cement products of the present invention are esthetically appealing, especially because the surface of these products displays the texture and color of the core materials, which provides the products with a natural yet modern look. In particular, the pale-colored fiber cement products of the present invention expose the natural texture of both the cement (which is white-colored or pale-colored) and the synthetic fibers (which are dark-colored), creating an appealing contrast between both components. Furthermore, the pale-colored products of the present invention are mechanically strong and highly resistant to cracks and wearing, even under harsh and adverse weather conditions. An additional advantage of the products according to the present invention is that, since the inner core and the surface consist of the same material, any faults or damage that may occur during the life-time of the products will be less visible compared to coated products, which typically have a surface color which is different from the inner mass color.

Presently, there is an increasing demand from architects and designers to develop new fiber cement products, visualizing the natural fiber cement core material. Of course, such natural looking building products have to fulfill the same standard national requirements with regard to mechanical and physical properties (i.e. mechanical strength, hydric movement etc.) as their corresponding predecessors. The present inventors have met this increasing market demand with the products of the present invention.

Accordingly, in a first aspect, the present invention provides pale-colored fiber cement products at least comprising white cement and synthetic fibers, wherein the synthetic fibers are pigmented with at least one dark pigment chosen from the group consisting of a black pigment, a brown pigment, a blue pigment, a red pigment, a green pigment and a gray pigment.

In particular embodiments, the synthetic fibers comprised in the pale-colored fiber cement products of the present invention are polypropylene fibers. In further particular embodiments, the synthetic fibers are polypropylene fibers having a thickness of about 70 dtex. In further particular embodiments, the synthetic fibers are milled polypropylene fibers. In yet further particular embodiments, the synthetic fibers are milled polypropylene fibers having an average length of about 1 mm to about 2 mm.

In particular embodiments, the synthetic fibers comprised in the pale-colored fiber cement products of the present invention are pigmented with at least one dark pigment, such as an iron oxide, carbon black, a manganese oxide, cobalt blue, a cobalt oxide, a chromium oxide, copper phthalocyanine, or ultramarine blue. In particular embodiments, the synthetic fibers comprised in the pale-colored fiber cement products of the present invention are pigmented with at least one dark pigment, which is an inorganic pigment.

In particular embodiments, the pale-colored fiber cement products of the present invention further comprise a white pigment. In further particular embodiments, the white pigment is present in an amount of between about 3 weight % and about 6 weight % (compared to the total dry weight of the fiber cement composition) of the fiber cement product. In yet further particular embodiments, the white pigment is chosen from the group consisting of a titanium oxide, a barium oxide, a barium sulfate and a barium containing mixture. In yet further particular embodiments, the white pigment is titanium oxide ($TiO_2$).

In particular embodiments, the pale-colored fiber cement products of the present invention further comprise limestone ($CaCO_3$) in an amount of between about 5 weight % and about 15 weight % (compared to the total dry weight of the fiber cement composition of said fiber cement product). In particular, the present inventors have found that $CaCO_3$ improves the water channeling properties of the fiber cement products of the present invention. Without being bound to any hypothesis or theory, the inventors believe that this is because white cement has a relatively low specific surface area compared to ordinary gray cement and therefore tends to enclose water in a higher degree. However, entrapped amounts of water are undesirable because these could be the cause of cracks and swelling of the fiber cement material upon exposure to rain and freeze-thaw conditions. The present inventors have managed to solve this issue by adding limestone. This ingredient ensures that a network of channels is created in between the cement particles of the fiber cement product, so as to ensure an optimal internal flow and channeling of water.

In particular embodiments, the pale-colored fiber cement products of the present invention are coated with a clear coating. In particular embodiments, the pale-colored fiber cement products of the present invention are coated with a clear coating, which clear coating comprises about 0.5% to about 4% (compared to the total dry weight of the fiber cement composition of said fiber cement product) of a white pigment. In further particular embodiments, the clear coating comprises about 1% to about 2% (compared to the total dry weight of the fiber cement composition of said fiber cement product) of a white pigment. In yet further particular embodiments, the clear coating comprises about 1% to about 2% (compared to the total dry weight of the fiber cement composition of said fiber cement product) of titanium oxide ($TiO_2$).

In particular embodiments, the pale-colored fiber cement products of the present invention are coated with a clear coating, which is a clear synthetic coating, such as a clear acrylic coating. In alternative particular embodiments, the clear coating is a UV-curable clear coating.

In a second aspect, the present invention provides methods for the manufacture of pale-colored fiber cement products according to the invention, which methods at least comprise the steps of:
a) Providing a fiber cement slurry at least comprising white cement and synthetic fibers, which synthetic fibers are pigmented with at least one dark pigment chosen from the group consisting of a black pigment, a brown pigment and a gray pigment;
b) Manufacturing a fiber cement product by means of a fiber cement production process;
c) Curing the fiber cement product, so as to obtain the pale-colored fiber cement product.

In particular embodiments, step c) of the methods according to the present invention comprises air-curing the fiber cement product.

In particular embodiments, the present invention provides methods for the manufacture of pale-colored fiber cement products, wherein step b) of manufacturing a fiber cement product is performed by means of a fiber cement production process chosen from the group consisting of a Hatschek process, a Magnani process, an extrusion process and a flow-on method. In further particular embodiments, the present invention provides methods for the manufacture of pale-colored fiber cement products, wherein step b) of manufacturing a fiber cement product is performed by means of a Hatschek production process.

In particular embodiments, the present invention provides methods for the manufacture of pale-colored fiber cement products, wherein at least one white pigment is added in the fiber cement slurry during step (i) of providing a fiber cement slurry. In further particular embodiments, the white pigment is added in an amount of between about 3 weight % and about 6 weight % (compared to the total dry weight of the fiber cement composition) of the fiber cement product. In further particular embodiments, the at least one white pigment is $TiO_2$.

In a third aspect, the present invention provides pale-colored fiber cement products obtainable by any of the methods according to the present invention.

In a fourth aspect, the present invention provides uses of the pale-colored fiber cement products according to the present invention as building materials.

In particular embodiments, the present invention provides uses of the pale-colored fiber cement products according to the present invention as an outer surface to walls, applied internally or externally, e.g. as façade plate, siding, etc. In other particular embodiments, the pale-colored fiber cement products according to the present invention can be used for decking applications, fencing applications and/or covering applications.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DETAILED DESCRIPTION OF THE INVENTION

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

"Fiber(s)" present in the fiber cement slurry as described herein may be for example process fibers and/or reinforcing fibers which both may be organic fibers (typically cellulose fibers) or synthetic fibers (polyvinyl alcohol, polyacrylonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders.

"White cement" present in the fiber cement slurry for the manufacture of the fiber cement products of the present invention may be for example but is not limited to white Portland cement.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

The term "cementitious" as in "cementitious product" or "cementitious material" as used herein refers to any product or material comprising cement, such as but not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The term "fiber cement product" as used herein refer to products at least comprising fibers and cement. The fiber cement products as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façlate, siding, etc.

The term "fiber cement layer" as used herein generally, and particularly in the context of the present invention, refers to any flat, optionally substantially rectangular, layer or cake essentially consisting of a fiber cement composition and having a thickness of at least about 1 mm, in particular between about 1 mm and 200 mm, more particularly between about 2 mm and about 150 mm, most particularly between about 4 mm and about 100 mm, such as between about 8 mm and about 10 mm.

A "Hatschek fiber cement layer" or a "Hatschek layer" as interchangeably used herein refers to a fiber cement layer (as defined herein), which is produced according to a Hatschek process, which at least comprises the steps of:

(i) building a fiber cement film on a sieve, which sieve rotates so as to be in contact with a fiber cement slurry in a vat;

(ii) transferring the fiber cement film from the sieve to the felt transport belt, and (iii) accumulating the fiber cement film on an accumulator roll via the felt transport belt.

In the context of the present invention, the use of the term "fiber cement film" refers to such a thin layer of fiber cement being applied onto the felt transport belt by one or more sieves rotating in a fiber cement slurry that is present in one or more vats of the Hatschek process. As may be understood from the aforementioned, series of thin fiber cement layers are produced on the one or more sieves from the Hatschek machine and subsequently superimposed and transferred from the one or more sieves to the transport belt, resulting in one or more uncured Hatschek fiber cement layers after accumulation on an accumulation roll. Thus, it will be clear that, when referring to "a fiber cement film" in the context of the present invention, it is to be understood that this term encompasses, where applicable, both the meaning of one single fiber cement film having a thickness of between about 0.01 mm and about 0.9 mm, such as in particular between about 0.05 mm and about 0.5 mm, such as between about 0.1 mm and about 0.4 mm, such as about 0.3 mm. (i.e. one thin layer of fiber cement also called a mono-layer, a single layer or a primary layer, that is applied onto the felt transport belt by a sieve from a vat of the Hatschek process) as well as the meaning of a layer comprising two or more superimposed fiber cement layers, each having a thickness of between about 0.01 mm and about 0.9 mm, such as in particular between about 0.05 mm and about 0.5 mm, such as between about 0.1 mm and about 0.4 mm, such as about 0.3 mm (i.e. two or more superimposed thin layers of fiber cement applied onto the felt transport belt by two or more sieves from a vat of the Hatschek process). The skilled person will understand, depending on the particular configuration of the Hatschek section, that when referring to processes of the invention in general both meanings of the term "fiber cement film" as described above will be applicable, while in more particular embodiments only one of both meanings are applicable. For instance, in a particular case where only one sieve is used in the Hatschek section for performing the processes of the invention, "a fiber cement film" as used herein means only one single layer having a thickness of between about 0.01 mm and about 0.9 mm that is applied onto the felt transport belt by the sieve from a vat of the Hatschek process. On the other hand, where two or more sieves are used in the Hatschek section for performing the processes of the invention, "a fiber cement film" as used herein means a superposition of two or more single layers, each having a thickness of between about 0.01 mm and about 0.9 mm, which are applied onto the felt transport belt by the sieve from a vat of the Hatschek process.

The term "water-permeable" as used herein when referring to a water-permeable (region of a) transport belt generally, and particularly in the context of the present invention, means that the material of which the water-permeable (region of the) belt is made allows water to flow through its structure to a certain extent.

The "water-permeability" as used herein when referring to the water-permeability of a (region of a) transport belt generally, and particularly in the context of the present invention, refers to the extent or degree to which the material of which the water-permeable (region of the) belt is made, allows water to flow through its structure. Suitable materials for water-permeable transport belts are known to the person skilled in the art, such as but not limited to felts.

A "non-hydrophobized (fiber cement) product" or a "non-hydrophobized fiber cement (film) layer" as used in the present context refers to a product, such as a fiber cement product or a fiber cement (film) layer, which has not been treated before, during or after its production, with a hydrophobizing agent. In particular, a "non-hydrophobized fiber cement product" or a "non-hydrophobized fiber cement sheet" as used herein will only comprise "fiber cement film layers", which are non-hydrophobized.

The terms "pale-colored" and "white-colored" when referring to a fiber cement product are used interchangeably herein and have the meaning that at least part of the, and preferably the entire, internal structure of that fiber cement product comprises white cement as the main ingredient.

The terms "internal (fiber cement) structure", "inner (fiber cement) structure", "internal (fiber cement) mass" or "inner (fiber cement) mass" as referred to interchangeably herein are used to indicate the fiber cement material present in a fiber cement product, which material is not visible with the eye when looking at the product from the outside.

The terms "external (fiber cement) structure" or "external (fiber cement) surface" as referred to interchangeably herein are used to indicate the fiber cement material which is exposed and visible on the outside of a fiber cement product.

A "transparent pigment" as used herein is meant to indicate a pigment of which the pigment particles have the property of transmitting visible light. Thus, a "transparent pigment" as used herein is a pigment, of which the majority of pigment particles are smaller than the wave length of visible light.

An "opaque pigment" as used herein is meant to indicate a pigment of which the pigment particles do not have the property of transmitting visible light. Thus, an "opaque pigment" as used herein is a pigment of which the majority of pigment particles are greater than the wave length of visible light.

A "semi-opaque pigment" (also referred to in the art as a semi-transparent pigment) as used herein is meant to indicate a pigment of which only a certain but significant percentage of pigment particles have the property of transmitting visible light. Thus, a "semi-opaque pigment" as used herein is a pigment of which a certain but significant percentage of pigment particles are greater than the wave length of visible light and of which the remaining percentage of pigment particles are smaller than the wave length of visible light.

The term "pigment" as used herein refers to a dry insoluble substance, usually pulverized, which when suspended in a liquid vehicle becomes a paint, ink, etc. Pigments typically consist of tiny solid particles that are used to enhance the appearance by providing color and/or to improve the physical (functional) properties of the paint or ink. Pigments used to provide color generally range from 0.2 to 0.4 microns in diameter. Functional pigments are typically 2-4 microns in diameter, but they may be as large as 50 microns.

The term "prime pigment" as used herein refers to any pigment (as defined herein), which is capable of providing whiteness and/or color to a substance while also contributing significantly to the hiding power of said substance. Prime pigments can be subdivided in white pigments and color pigments.

The term "white pigment" as referred to herein means a prime pigment, capable of scattering light and providing whiteness and hiding in flat or glossy paint or ink. White inorganic pigments include but are not limited to antimony pigments including Antimony White: $Sb_2O_3$; lead pigments (toxic) including White Lead $(PbCO_3)_2.Pb(OH)_2$; titanium pigments including Titanium White: titanium (IV) oxide $TiO_2$ and; zinc pigments including Zinc White: Zinc Oxide (ZnO).

The term "color pigment" as referred to herein means a prime pigment, capable of selectively absorbing light and providing color to a paint or ink. There are two main types of color pigments: organic pigments, which include the brighter colors but are not highly durable in exterior use and inorganic pigments, which are not as bright as organic colors but are the most durable exterior pigments.

The term "inorganic pigment" as used herein refers to naturally occurring mineral coloring compounds typically consisting of metallic salts. Inorganic pigments are usually oxides or sulphides of one or more metals.

Inorganic pigments include for instance but are not limited to:

Blue Inorganic Pigments:
aluminum pigments, including ultramarine: a complex naturally occurring pigment of sulfur-containing sodio-silicate ($Na_{8-10}Al_6Si_6O_{24}S_{2-4}$);
cobalt pigments, including Cobalt Blue and Cerulean Blue: cobalt(II) stannate;
copper pigments, including Egyptian Blue: a synthetic pigment of calcium copper silicate ($CaCuSi_4O_{10}$) and Han Blue BaCuSi4O10; and
iron pigments, including Prussian Blue: a synthetic pigment of ferric hexacyanoferrate ($Fe_7(CN)_{18}$);

Green Inorganic Pigments
cadmium pigments, including Viridian: a dark green pigment of hydrated chromium(III) oxide ($Cr_2O_3$) and Cadmium Green: a light green pigment consisting of a mixture of Cromium Yellow (CrS) and Viridian ($Cr_2O_3$);
chromium pigments, including Chrome Green;

copper pigments, including Paris Green: copper(II) acetoarsenite $(Cu(C_2H_3O_2)_2 \cdot 3Cu(AsO_2)_2)$ and Scheele's Green (also called Schloss Green): copper arsenite $CuHAsO_3$;

Yellow Inorganic Pigments arsenic pigments including Orpiment natural monoclinic arsenic sulfide $(As_2S_3)$;

cadmium pigments including Cadmium Yellow: cadmium sulfide (CdS);

chromium pigments including Chrome Yellow: natural pigment of lead(II) chromate $(PbCrO_4)$;

cobalt pigments including Aureolin (also called Cobalt Yellow): Potassium cobaltinitrite $(Na_3Co(NO_2)_6$;

iron pigments including Yellow Ochre: a naturally occurring clay of hydrated iron oxide $(Fe_2O_3 \cdot H_2O)$;

lead pigments including Naples Yellow;

titanium pigments including Titanium Yellow;

tin pigments including Mosaic gold: stannic sulfide $(SnS_2)$;

Orange Inorganic Pigments cadmium pigments including Cadmium Orange: an intermediate between cadmium red and cadmium yellow: cadmium sulfoselenide;

chromium pigments including Chrome Orange: a naturally occurring pigment mixture composed of lead(II) chromate and lead(II) oxide. $(PbCrO_4+PbO)$ Red Inorganic Pigments cadmium pigments including Cadmium Red: cadmium selenide (CdSe);

iron oxide pigments including Sanguine, Caput Mortuum, Oxide Red, Red Ochre: anhydrous $Fe_2O_3$, Burnt Sienna: a pigment produced by heating Raw Sienna, Venetian Red;

lead pigments (toxic) including Red Lead: lead tetroxide, $Pb_3O_4$;

mercury pigments (toxic) including Vermilion: Synthetic and natural pigment: Occurs naturally in mineral cinnabar; Mercuric sulfide (HgS);

Brown Inorganic Pigments clay earth pigments (naturally formed iron oxides) including Raw Umber: A natural clay pigment consisting of iron oxide, manganese oxide and aluminum oxide: $Fe_2O_3+MnO_2+nH_2O+Si+AlO_3$; Raw Sienna: a naturally occurring yellow-brown pigment from limonite clay;

Black Inorganic Pigments

Carbon pigments including Carbon Black, Ivory Black, Vine Black, Lamp Black;

Iron Pigments including $Fe_3O_4$;

Titanium pigments: Titanium Black;

Gray Inorganic Pigments

Payne's gray: a mixture of Ultramarine and black or of Ultramarine and Sienna;

The term "organic pigment" as used herein refers to synthetic organic coloring compounds, which are carbon based molecules manufactured from petroleum compounds, acids, and other chemicals, usually under intense heat or pressure.

Organic pigments include for instance but are not limited to:

Yellow Organic Pigments:

Yellow Lakes, which are transparent pigments used as a yellow to cover other inks but not hide them, Tartrazine Yellow Lake (also called FD&C Yellow No. 5 and used as a dyestuff in foods), Hansa Yellows, and Diarylide Yellows, which are the most common yellow pigments used in printing inks. Fluorescent Yellow is also used in some specialty applications. Organic Yellows are commonly used to replace Chrome Yellows;

Orange Organic Pigments:

The most common orange pigment is Diarylide Orange, a transparent yet not very fast-to-light pigment. Other assorted orange materials tend to be used where orange pigments are necessary, and include DNA Orange, Pyrazolone Orange, Fast Orange F2G, Benzimidazolone Orange HL, and Ethyl Lake Red C;

Red Organic Pigments:

Reds include Para Reds, Toluidine Red, ["Permanent Red "R"], Carmine F. B., Naphthol Reds and Rubines, Permanent Red FRC, Bordeaux FRR, Rubine Reds, Lithol Reds, BON Red, Lithol Rubine 4B, BON Maroon, Rhodamine 6G, Lake Red C, BON Arylamide Red, Quinacrinone Magentas, Copper Ferrocyanide Pink, Benzimidazolone Carmines and Reds, Azo Magenta G, Anthraquinone Scarlet, and Madder Lakes;

Blue Organic Pigments:

'Blues'. Blues include Phthalocyanine Blues (the most commonly used group of organic blue pigments), PMTA Victoria Blue, Victoria Blue CFA, Ultramarine Blue, Indanthrene Blue, Alkali Blues, and Peacock Blue;

Violet Organic Pigments:

Violets overlap slightly with some of the bluer reds (such as Benzimidazolone Bordeaux HF 3R (see Benzimidazolone Carmines and Reds), and also include such pigments as PMTA Rhodamine, PMTA Violet (also known as Methyl Violet), Dioxazine Violet (RL) Carbazole Violet, Crystal Violet, Dioxazine Violet B, and Thioindigoid Red;

Green Organic Pigments:

A common series of greens are the Phthalocyanine Greens as well as the PMTA Greens;

Brown Organic Pigments:

Brown pigments include Diazo Brown and Benzimidazolone Brown HFR;

The terms "extender pigment" or "filler pigment" as used herein refers to any pigment (as defined herein) having a low refractive index or opacity and therefore not providing color or hiding power to a substance. Extender or filler pigments appear transparent in a paint or ink. Extender pigments have significant positive effects on various properties of the paint for example, as described further below, mica can improve the water resistance of a film due to its "platy" particle shape and tendency to orient itself in overlapping layers horizontal to the surface. Extender pigments or filler pigments for instance include but are not limited to Barium Sulphate, Calcium Carbonate, Magnesium Silicate, Mica, Kaolin (China Clay), Asbestine, Talc, Silica/Quartz, Alumina Hydrate, Kalunite, Pumice, Bentonite, Vermiculite, and Glass Beads.

The term "UV-curable" refers to a composition that can polymerize upon application of UV irradiation. Typically, this at least implies the presence of photo-polymerizable monomers or oligomers, together with photoinitiators and/or photosensitizers.

A "clear coat" or a "clear coating composition" as referred to herein is used to indicate a coating formulation or composition having the property of transmitting rays of light through its substance so that surfaces or objects, which are situated beyond or behind the coating, such as surfaces or objects coated by such transparent coating, are distinctly visible.

The term "transparent" or "transparency" when referring to a coating composition or a coating layer refers to the physical characteristic of allowing light to pass through the coating without being scattered. Transparency can be measured with any method known in the art. For instance, a haze meter measures the transparency, haze, see-through quality, and total transmittance of a coating, based on how much visible light is diffused or scattered when passing through the coating. Haze is measured with a wide angle scattering test in which light is diffused in all directions which results in a loss of contrast. That percentage of light that when passing through deviates from the incident beam greater than 2.5 degrees on average is defined as haze. See through quality is measured with a narrow angle scattering test in which light is diffused in a small range with high concentration. This test measures the clarity with which finer details can be seen through the coating being tested. The haze meter also measures total transmittance. Total transmittance is the measure of the total incident light compared to the light that is actually transmitted (e.g. total transmittance). So the incident light may be 100%, but because of absorption and reflection the total transmittance may only be 94%. The data gained from the haze meter can be transferred to a PC for further data processing to ensure a consistent product.

The term "(staple) length of fiber(s)" as used herein refers to the average length of a group of (staple) fibers of any composition. For cut synthetic fibers, such as polypropylene fibers, the (staple) length refers to the discrete length to which these fibers have been cut, and is thus the same for every fiber present in the group. For broken or torn synthetic fibers, such as polypropylene fibers, the (staple) length refers to the average length to which these fibers have been broken or torn.

In the context of the present invention, the term "polypropylene" is intended to include any polymeric composition comprising propylene monomers, either as a homopolymer or copolymer with other polyolefins, dienes, or other monomers (such as ethylene, butylene, and the like). The term is also intended to encompass any different configuration and arrangement of the constituent monomers (such as syndiotactic, isotactic, and the like). Thus, the term as applied to filaments, monofilaments, multifilaments or fibers herein, is intended to encompass endless stretches, actual long strands, threads, and the like, of polypropylene homopolymer or copolymer.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

The present invention provides novel pale-colored fiber cement products, which are mechanically strong and highly resistant to cracks and wearing, even under harsh and adverse weather conditions. In addition, the fiber cement products as provided by the present invention have an attractive appearance because of their specific esthetic features, whereby the natural texture of both the cement (which is white-colored or pale-colored) and the synthetic fibers (which are dark-colored) is exposed, creating an appealing contrast between both components. This provides the products with a natural yet modern look and additionally provides for the advantage that any defects or damages occurring during the life-time of the products will be less visible compared to coated products, which typically have a surface color which is different from the inner mass color.

Accordingly, in view of the above, it is clear that the present invention provides fiber cement products, which are both technically (good mechanical strength and impact resistance and highly wearproof) and esthetically (intense though natural appearing colour and no colour change upon damage) improved.

In a first aspect, the present invention provides pale-colored fiber cement products at least comprising white cement and synthetic fibers, wherein the synthetic fibers are pigmented with at least one dark pigment chosen from the group consisting of a black pigment, a brown pigment, a red pigment, a blue pigment, a green pigment and a gray pigment.

In the context of the present invention, fiber cement products are to be understood as cementitious products comprising cement and synthetic (and optionally natural) fibers. The fiber cement products are made out of fiber cement slurry, which is formed in a so-called "green" fiber cement product, and then cured.

Dependent to some extent on the curing process used, the fiber cement slurry typically comprises water, process or reinforcing fibers which are synthetic organic fibers (and optionally also natural organic fibers, such as cellulose), cement (e.g. Portland cement), limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, antifoaming agents, flocculants, and/or other additives.

The fiber cement products according to the present invention are "pale-colored" or "white-colored" (as defined herein). The pale color of the products of the invention is obtained by using white cement as the cementitious matrix. White cement, such as for example white ordinary Portland cement (WOPC) is similar to ordinary, gray Portland cement in all aspects except for its high degree of whiteness. Obtaining this color requires substantial modification to the method of manufacture, and because of this, it is more expensive than the gray product. White Portland cement differs physically from gray cement only in terms of its color. Its setting behavior and strength development are essentially the same as that expected in gray cement, and it meets standard specifications such as ASTM C 150 and EN 197. In practice, because much white cement is used in pre-cast concrete products, it is commonly made to a high-early strength specification such as ASTM C 150 Type III. The whiteness of the product is typically expressed in terms of a reflectance measurement, such as L*a*b L-value, or tristimulus.

The pale-colored fiber cement products of the present invention comprise 20 to 95 weight % of white cement as hydraulic binder. In particular embodiments, white cement in the products of the invention is white Portland cement.

In particular embodiments, the pale-colored fiber cement products of the present invention further comprise in their cementitious matrix a white pigment. In further particular embodiments, the white pigment is present in an amount of between about 3 weight % and about 6 weight %, such as more particularly in an amount of between about 3 weight % and about 5 weight %, such as most particularly in an amount of about 4.6 weight % of white pigment (compared to the total dry weight of the fiber cement composition). In yet further particular embodiments, the white pigment is chosen from the group consisting of titanium oxide, a barium oxide, a barium sulphate and a barium containing mixture. In yet further particular embodiments, the white pigment is titanium oxide ($TiO_2$). In yet further particular embodiments, the white pigment is titanium oxide ($TiO_2$) and is present in an amount of about 4.6 weight % (compared to the total dry weight of the fiber cement composition).

The pale-colored fiber cement products of the present invention at least further comprise pigmented synthetic fibers.

In particular embodiments, the fiber cement products of the present invention comprise from about 0.1 to about 5 weight %, such as particularly from about 0.5 to about 4 weight % of pigmented synthetic fibers, such as more particularly between about 1 to 3 weight % of pigmented synthetic fibers, such as most particularly about 2 weight % of pigmented synthetic fibers with respect to the total weight of the fiber cement product.

In further particular embodiments, the pigmented synthetic fibers in the pale-colored fiber cement products of the present invention are selected from the group consisting of pigmented polypropylene fibers, pigmented polyvinylalcohol fibers, pigmented polyacrylonitrile fibers, polyethelene, pigmented polyamide fibers, pigmented polyester fibers, pigmented aramide fibers and pigmented carbon fibers. In yet further particular embodiments, the pigmented synthetic fibers in the pale-colored fiber cement products of the present invention are pigmented polypropylene fibers.

In particular embodiments, the pigmented synthetic fibers are polypropylene fibers having a thickness of about 70 dtex.

In particular embodiments, the pigmented synthetic fibers are milled pigmented polypropylene fibers. In particular embodiments, the synthetic fibers are milled polypropylene fibers having an average length of about 1 mm to about 2 mm.

The pigmented synthetic fibers in the pale-colored fiber cement products of the present invention are pigmented with at least one dark pigment chosen from the group consisting of a black pigment, a brown pigment, a red pigment, a blue pigment, a green pigment and a gray pigment. In particular embodiments, the pigmented synthetic fibers are pigmented with a gray iron oxide, a black iron oxide, a brown iron oxide, or carbon black.

In particular embodiments of the present invention, the pigments suitable for pigmenting the synthetic fibers for use in the pale-colored fiber cement products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

In particular embodiments, the fiber cement products according to the invention are characterized in that they additionally comprise non-pigmented or pigment-free synthetic fibers in a weight % of about 0.1 to about 5, such as particularly from about 0.5 to about 4, such as more particularly between about 1 to 3 with respect to the total weight of the fiber cement product. Most particularly, pigment-free synthetic fibers are present in the pale-colored fiber cement products of the present invention in a weight % of about 2 weight % with respect to the total weight of the fiber cement product.

In particular embodiments, these pigment-free synthetic fibers are selected from the group consisting of polypropylene fibers, polyvinylalcohol fibers, polyacrylonitrile fibers, polyethelene fibers, polyamide fibers, polyester fibers, aramide fibers and carbon fibers. In yet further particular embodiments, these pigment-free synthetic fibers are polyvinylalcohol (PVA) fibers, such as but not limited to pigment-free PVA fibers with a thickness of about 8 dtex.

In further particular embodiments, natural fibers, such as cellulose fibers may in addition be added to the fiber cement formulations of the present invention. In these particular embodiments, the fiber cement products of the present invention may comprise from about 2 to about 5 weight %, such as particularly about 2 to about 4 weight % of cellulose fibers, such as more particularly about 3 weight % of cellulose fibers with respect to the total weight of the fiber cement product. These cellulose fibers may for example be Kraft softwood cellulose fibers, such as bleached Kraft softwood cellulose fibers.

In further particular embodiments, additional fibers may be added to the cement formulations and may be selected from the group consisting of glass fibers, rockwool fibers, slag wool fibers, wollastonite fibers, ceramic fibers and the like. In further particular embodiments, the fiber cement products of the present invention may additionally comprise fibrils fibroids, such as for example but not limited to, polyolefinic fibrils fibroids % in a weight % of about 0.1 to 3, such as "synthetic wood pulp".

In particular embodiments, the pale-colored fiber cement products of the present invention further comprise limestone ($CaCO_3$) in an amount of between about 5 weight % and about 15 weight %, such as between about 7 weight % and about 13 weight %, such as more particularly between about 9 weight % and about 11 weight %, such as most particularly about 10 weight % of $CaCO_3$ (compared to the total dry weight of the fiber cement composition of said fiber cement product). In particular, the present inventors have found that $CaCO_3$ improves the water channeling properties of the fiber cement products of the present invention. Without being bound to any hypothesis or theory, the inventors believe that this is because white cement has a relatively low specific surface area compared to ordinary gray cement and therefore tends to enclose water in a higher degree. However, entrapped amounts of water are undesirable because these could be the cause of cracks and swelling of the fiber cement material upon exposure to rain and freeze-thaw conditions. The present inventors have managed to solve this issue by adding limestone. This ingredient ensures that a network of channels is created in between the cement particles of the fiber cement product, so as to ensure an optimal internal flow and channeling of water.

According to particular embodiments, the fiber cement products according to the invention optionally comprise further components. These further components in the fiber cement products of the present invention may be selected from the group consisting of water, sand, silica sand flour, condensed silica fume, microsilica, fly-ashes, ground quartz, the ground rock, clays, pigments, kaolin, metakaolin, blast furnace slag, carbonates, pozzolans, aluminium hydroxide, wollastonite, mica, perlite, calcium carbonate, and other additives (e.g. colouring additives) etc. It will be understood that each of these components is present in suitable amounts, which depend on the type of the specific fiber cement product and can be determined by the person skilled in the art. In particular embodiments, the total quantity of such further components is preferably lower than 70 weight % compared to the total initial dry weight of the composition.

Further additives that may be present in the fiber cement products of the present invention may be selected from the group consisting of dispersants, plasticizers, antifoam agents and flocculants. The total quantity of additives is preferably between about 0.1 and about 2 weight % compared to the total initial dry weight of the composition.

In particular embodiments, the fiber cement products of the invention have a thickness of between about 5 mm and about 25 mm, in particular between about 5 mm and about 20 mm.

In particular embodiments, the fiber cement products of the invention have a length of between about 2 m and about 6 m, in particular between about 2 m and about 4 m, more in particular of about 2.40 m or of about 3.50 m.

In particular embodiments, the fiber cement products of the invention have a width of between about 1 m and about 4 m, more in particular of about 1.20 m.

In particular embodiments, the pale-colored fiber cement products of the present invention are coated with a clear coating (as defined herein).

In further particular embodiments, the clear coating is a conventional (i.e. not radiation-curable) clear coating. Suitable conventional clear coatings are those with binders obtained by aqueous free radical or ionic emulsion polymerization. Acrylic and/or methacrylic (co)polymers are particularly preferred as binders of the conventional clear coatings. These acrylic and/or methacrylic (co)polymers are usually prepared by aqueous radically initiated emulsion polymerization of esters of acrylic acid and/or methacrylic acid with C1-C12 alkanols as well as a minor amount of acrylic and/or methacrylic acid as monomers. Preference is given in particular to esters of acrylic and methacrylic acid with C1-C8 alkanols; ethyl acrylate, n-butyl acrylate, ethylhexyl acrylate and methylmethacrylate are particularly preferred. The emulsion polymerization requires the use of surfactants as stabilizers. Non-ionic surfactants are preferred. Alcohol ethoxylates are particularly preferred. Conventional coatings with a hydroxyl number (measured according to ISO 4629) of at least 1 are preferred. Hydroxyl numbers of at least 1.5 are particularly preferred. Preferably the minimum film forming temperature during the drying of the conventional coating is below 60° C.

The conventional clear coating composition generally comprises, besides the polymeric binders and pigments, also usual auxiliaries, e.g. fillers, wetting agents, viscosity modifiers, dispersants, defoamers, preservatives and hydrophobisizers, biocides, fibers and other usual constituents. Examples of suitable fillers are aluminosilicates, silicates, alkaline earth metal carbonates, preferably calcium carbonate in the form of calcite or lime, dolomite, and also aluminum silicates or magnesium silicates, e.g. talc. The solids content of suitable conventional clear coatings is generally in the range from 20 to 60% by weight. The conventional clear coating compositions comprise as liquid component essentially water and, if desired, an organic liquid miscible with water, for example an alcohol. The conventional coating compositions are applied at a wet coating weight in the range from 50 to 500 g/m$^2$, in particular from 70 to 300 g/m$^2$, in a known manner, for example by spraying, troweling, curtain coating, knife application, brushing, rolling or pouring onto the cement bonded board, or by a combination of one or more applications.

In alternative particular embodiments, the clear coating is a radiation-curable clear coating. Radiation-curable coatings are known in the art and comprise at least one polymer A having ethylenically unsaturated double bonds, which is radiation-curable. Possible polymers A for the radiation-curable compositions are in principle any polymers having ethylenically unsaturated double bonds which can undergo radical-initiated polymerization on exposure to UV radiation or electron beam radiation. Care should be taken here that the content of ethylenically unsaturated double bonds in the polymer is sufficient to ensure effective crosslinking. The content of ethylenically unsaturated double bonds in A is generally in the range from 0.01 to 1.0 mol/100 g of A, more preferably from 0.05 to 0.8 mol/100 g of A and most preferably from 0.1 to 0.6 mol/100 g of A.

Suitable polymers A are polyurethane derivatives which contain ethylenically unsaturated double bonds, such as polyurethane acrylates.

The radiation-curable composition further comprises at least one chemically and radiation crosslinkable polymer B. Suitable polymers B are free isocyanate-bearing polyurethanes having ethylenically unsaturated double bonds. Polyurethane acrylates with free isocyanate groups are preferred. The reaction of the free isocyanate groups with moisture present in the air takes place at room temperature, in particular, in areas not exposed to radiation and hence not completely cured (back side, edges, cavities formed in the radiation-curable coating, . . . ). The free isocyanate content of B measured according to DIN EN ISO 11 909, ranges usually from 5 to 20% by weight. Preferably the free isocyanate content of B is between 8 and 20% by weight and more preferably between 10 and 18% by weight. The weight ratio of B/A is preferably in the range of 0.03/0.2. A weight ratio of B/A in the range of 0.05/0.1 is particularly preferred. Besides the polymers A and B, the radiation-curable preparations may also contain a compound different from polymer A and polymer B and having a molecular weight of less than 800 g/mol and capable of polymerization by cationic or free-radical pathways. These compounds have generally at least one ethylenically unsaturated double bond and/or one epoxy group and a molecular weight being less than 800 g/mol. Such compounds generally serve to adjust to the desired working consistency of the radiation-curable preparations. This is particularly important if the preparation contains no other diluents, such as water and/or inert organic solvents, or contains these only to a subordinate extent. Such compounds are therefore also termed reactive diluents. The proportion of reactive diluents, based on the total amount of (A+B) and the reactive diluent in the radiation-curable preparation, is preferably in the range of 0 to 90% by weight, and most preferably in the range of from 5 to 50% by weight. Preferred reactive diluents are the esterification products of di- or polyhydric alcohols with acrylic and/or methacrylic acid. Such compounds are generally termed polyacrylates or polyether acrylates. Hexanediol diacrylate, tripropylene glycol diacrylate and trimethylolpropane triacrylate are particularly preferred. The radiation-curable compositions may also comprise polymers which have cationically polymerizable groups, in particular epoxy groups. These include copolymers of ethylenically unsaturated monomers, the copolymers containing, as comonomers, ethylenically unsaturated glycidyl ethers and/or glycidyl esters of ethylenically unsaturated carboxylic acids. They also include the glycidyl ethers of OH-group-containing polymers, such as OH-group-containing polyethers, polyesters, polyurethanes and novolacs. They include moreover the glycidyl esters of polymers containing carboxylic acid groups. If it is desired to have a cationically polymerizable component, the compositions may comprise, instead of or together with the cationically polymerizable polymers, a low-molecular-weight, cationically polymerizable compound, for example a di- or polyglycidyl ether of a low-molecular-weight di- or polyol or the di- or polyester of a low-molecular weight di- or polycarboxylic acid.

The radiation-curable compositions comprise usual auxiliaries, such as thickeners, flow control agents, defoamers, UV stabilizers, emulsifiers, surface tension reducers and/or protective colloids. Suitable auxiliaries are well known to the person skilled in the coatings technology. Silicones, particularly polyether modified polydimethylsiloxane copolymers, may be used as surface additives to provide good substrate wetting and good anti-crater performance by reduction of surface tension of the coatings. Suitable stabilizers encompass typical UV absorbers, such as oxanilides, triazines, benzotriazoles (obtainable as Tinuvin™ grades from Ciba Geigy) and benzophenones. These may be used in combination with usual free-radical scavengers, for example sterically hindered amines, e.g. 2,2,6,6-tetramethylpiperidine and 2,6-di-tert-butylpiperidine (HALS compounds). Stabilizers are usually used in amounts of from 0.1 to 5.0% by weight and preferably from 0.3 to 2.5% by weight, based on the polymerizable components present in the preparation.

If curing of the radiation-curable coating is performed by UV radiation (step f), the preparations to be used comprise at least one photoinitiator. A distinction is to be made here between photoinitiators for free-radical curing mechanisms (polymerization of ethylenically unsaturated double bonds) and photoinitiators for cationic curing mechanisms (cationic polymerization of ethylenically unsaturated double bonds or polymerization of compounds containing epoxy groups). Photoinitiators are not needed for electron beam curable compositions.

Suitable photoinitiators for free-radical photopolymerization, i.e. polymerization of ethylenically unsaturated double bonds, are benzophenone and benzophenone derivatives, such as 4-phenylbenzophenone and 4-chlorobenzophenone, Michler's ketone, anthrone, acetophenone derivatives, such as 1-benzoylcyclohexan-1-ol, 2-hydroxy-2,2-dimethylacetophenone and 2,2-dimethoxy-2-phenylacetophenone, benzoin and benzoin ethers, such as methyl benzoin ether, ethyl benzoin ether and butyl benzoin ether, benzil ketals, such as benzil dimethyl ketal, 2-methyl-1-[4-(methylthio) phenyl]-2-morpholinopropan-1-one, anthraquinone and its derivatives, such as .beta.-methylanthraquinone and tertbutylanthraquinone, acylphosphine oxides, such as 2,4,6-trimethylbenzoyldiphenylphosphine oxide, ethyl-2,4,6-trimethylbenzoylphenylphosphinate and bisacylphosphine oxides. Suitable photoinitiators for cationic photopolymerization, i.e. the polymerization of vinyl compounds or compounds containing epoxy groups, are aryl diazonium salts, such as 4-methoxybenzenediazonium hexafluorophosphate, benzenediazonium tetrafluoroborate and toluenediazonium tetrafluoroarsenate, aryliodonium salts, such as diphenyliodonium hexafluoroarsenate, arylsulfonium salts, such as triphenylsulfonium hexafluorophosphate, benzene- and toluenesulfonium hexafluorophosphate and bis[4-diphenylsulfoniophenyl] sulfide bishexafluorophosphate, disulfones, such as diphenyl disulfone and phenyl-4-tolyl disulfone, diazodisulfones, imidotriflates, benzoin tosylates, isoquinolinium salts, such as N-ethoxyisoquinolinium hexafluorophosphate, phenylpyridinium salts, such as N-ethoxy-4-phenylpyridinium hexafluorophosphate, picolinium salts, such as N-ethoxy-2-picolinium hexafluorophosphate, ferrocenium salts, titanocenes and titanocenium salts.

The abovementioned photoinitiators are used, in amounts from 0.05 to 20% by weight, preferably from 0.1 to 10% by weight and in particular from 0.1 to 5% by weight, based on the polymerizable components of the radiation-curable composition.

The radiation-curable compositions are applied in a known manner, e.g. by spraying, troweling, knife application, brushing, rolling or pouring onto the cement bonded board. It is also conceivable that the preparation may be applied to the cement board by hot-melt processes or by powder-coating processes. The radiation-curable composition is preferably applied by roller-coating. The radiation-curable composition is usually applied to obtain a dry thickness in the range from 10 to 100 Pm, preferably from 50 to 80 Pm. The application may take place either at room temperature or at elevated temperature, but preferably not above 100° C. The liquid coated surface is roll-covered with a radiation permeable film before applying radiation. Care is taken to have an intimate contact between the liquid coated panels and the controlled surface layer of the film, in order to remove entrapped bubbles and air pockets between the overlying film and the panel by the roller. This film provides protection against the radical chain-breaking reaction of oxygen, and avoids the use of inert gas atmosphere in the case of electron beam curing. Moreover, this covering film has a controlled gloss surface with a predetermined surface finish on the side in contact with the liquid coated panel surface. Suitable radiation permeable films are thin plastic films of polyester or polyolefins. The controlled surface gloss on the radiation permeable film can be obtained in various ways, such as embossing, printing, coating, etching or by the use of matting additives. Moreover, the radiation permeable film with its regularly distributed surface microroughness can possibly be texturized, e.g. allowing labeling.

The radiation curable coating may be cured by exposure to UV radiation of wavelength generally from 200 to 600 nm. Suitable examples of UV sources are high and medium pressure mercury, iron, gallium or lead vapor lamps. Medium pressure mercury vapor lamps are particularly preferred, e.g. the CK or CK1 sources from the company IST (Institut für Strahlungstechnologie). The radiation dose usually sufficient for crosslinking is in the range from 80 to 3000 mJ/cm2. Any solvent present, in particular water, is dried out before the curing in a separate drying step preceding curing, for example by heating to temperatures in the range from 40 to 80° C., or by exposure to IR radiation.

In case of electron beam curing, irradiation is performed with high-energy electrons (usually from 100 to 350 keV, by applying a high voltage to tungsten filaments inside a vacuum chamber), and the actual curing step takes place in an inert, oxygen-free atmosphere. After irradiation, the covering film is removed by peeling it off.

In other particular embodiments, the clear coating applied on the pale-colored fiber cement products of the invention is a combination of one or more layers of a conventional clear coating and one or more layers of a radiation curable clear coating.

In particular embodiments, at least one layer of the conventional clear coating composition and/or at least one layer of the radiation-curable clear coating of the products of the present invention comprises at least one white pigment. In further particular embodiments, at least one layer of the conventional clear coating and/or radiation curable clear coating composition comprises about 0.5 weight % to about 4 weight % (compared to the total dry weight of the coating composition) of a white pigment. In further particular embodiments, at least one layer of the conventional clear coating and/or radiation curable clear coating comprises about 1% to about 2% (compared to the total dry weight of the fiber cement composition of said fiber cement product) of a white pigment. In yet further particular embodiments, at least one layer of conventional clear coating and/or radiation curable clear coating composition comprises about 1 weight % to about 2 weight % (compared to the total dry weight of the coating composition) of $TiO_2$.

In particular embodiments of the present invention, the white pigments, suitable for pigmenting the clear coating for application onto the pale-colored fiber cement products of the present invention, are essentially alkali-resistant pigments, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

In a second aspect, the present invention provides methods for the manufacture of pale-colored fiber cement products according to the invention, which methods at least comprise the steps of:

a) Providing a fiber cement slurry at least comprising white cement and synthetic fibers, which synthetic fibers are pigmented with at least one dark pigment chosen from the group consisting of a black pigment, a brown pigment and a gray pigment;

b) Manufacturing a fiber cement product by means of a fiber cement production process;

c) Curing the fiber cement product, so as to obtain the pale-colored fiber cement product.

In the first step a) of the methods of the present invention, a fiber cement slurry can be prepared by using one or more sources of at least white cement, water and pigmented synthetic fibers in the amounts as previously disclosed herein. In certain specific embodiments, these one or more sources of at least white cement, water and pigmented synthetic fibers are operatively connected to a continuous mixing device constructed so as to form a cementitious fiber cement slurry.

In particular embodiments, the present invention provides methods for the manufacture of pale-colored fiber cement products, wherein at least one white pigment is added in the fiber cement slurry during step a) of providing a fiber cement slurry. In further particular embodiments, the white pigment is added in an amount of between about 3 weight % and about 6 weight % (compared to the total dry weight of the fiber cement composition) of the fiber cement product. In further particular embodiments, the at least one white pigment is $TiO_2$.

Once a fiber cement slurry is obtained, the manufacture of the fiber cement products can be executed according to any known procedure. Indeed, in the methods of the invention, the step b) of providing a fiber cement product, can be performed according to any method known in the art for preparing fiber cement products, which products at least comprise white cement, water and pigmented synthetic fibers.

The process most widely used for manufacturing fiber cement products is the Hatschek process, which is performed using a modified sieve cylinder paper making machine. Other manufacturing processes that can be used include the Magnani process, injection, flow-on, extrusion and others. In particular embodiments, the fiber cement products of the present invention are provided by using the Hatschek process. The "green" or uncured fiber cement product is optionally post-compressed usually at pressures in the range from about 22 to about 30 MPa to obtain the desired density.

The processes according to the present invention may further comprise the step of cutting the fiber cement products to a predetermined length to form a fiber cement product. Cutting the fiber cement products to a predetermined length can be done by any technique known in the art, such as but not limited to water jet cutting, air jet cutting or the like. The fiber cement products can be cut to any desirable length and width but preferably to the dimensions as disclosed previously herein for the products of the present invention. Thus, in particular embodiments, the pale-colored fiber cement products of the present invention can be cut into specific dimensions so as to form fiber cement boards, panels, plates, sidings, planks, tiles etc.

It will be understood by the skilled person that the processes of the present invention may further comprise additional steps of processing the produced fiber cement products.

For instance, in certain particular embodiments, during the processes of the present invention, the fiber cement slurry and/or the fiber cement products may undergo various intermediate treatments, such as but not limited to treatment with one or more hydrophobic agents, treatment with one or more flocculants, additional or intermediate pressing steps, etc.

As soon as the fiber cement products are formed, these are trimmed at the lateral edges. The border strips can optionally be recycled through immediate mixing with the recycled water and directing the mixture to the mixing system again.

In step c) of the methods of the present invention, the obtained fiber cement products are cured. Indeed, after production, fiber cement products can be allowed to cure over a time in the environment in which they are formed, or alternatively can be subjected to a thermal cure (e.g. by autoclaving or the like).

In particular embodiments, the fiber cement products of the present invention are air-cured. This air-curing step involves curing the green fiber cement products under ambient conditions for about 2 to 4 weeks, such as for about 3 weeks.

It has been found by the present inventors that air-cured fiber cement products as produced according to the methods as disclosed herein perform particularly well, especially having regard to their mechanical characteristics, such as impact resistance and mechanical strength. This will become clear from the Examples as further described herein.

In yet further particular embodiments, the "green" fiber cement products may be first pre-cured to the air, after which the pre-cured product is further air-cured until it has its final strength to give the product its final properties.

In particular embodiments of the present invention, the processes may further comprise the step of thermally drying the obtained fiber cement products. After curing, the fiber cement product being a panel, sheet or plate, etc. may still comprise a significant weight of water, present as humidity. This may be up to 10 even 15% w, expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

During step (a) of the methods of the present invention, one or more white pigments may be added to the fiber cement in order to increase the pale or white color intensity of the fiber cement product in production. Methods for coloring fiber cement products in the mass are known to the person skilled in the art.

This may for example (but not necessarily only) be achieved by adding one or more white pigments to the fiber cement slurry prior to the production of the fiber cement product.

In particular embodiments of the methods of the present invention, the at least one white pigment for use in the fiber cement products of the present invention is white titanium oxide. In further particular embodiments, the at least one white pigment for use in the fiber cement products of the present invention is white titanium oxide in a total amount of about 3 to 6 weight % (weight % total pigment compared to the total dry weight of the fiber cement composition).

In particular embodiments of the present invention, the white pigments suitable for use in the fiber cement products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

In particular embodiments of the present invention, the methods may further comprise the step of surface treating the produced uncoated pale-colored fiber cement products. Surface treatments may include, without limitation, abrasive blasting, engraving, embossing and the like, of a decorative pattern onto or into the fiber cement product surface.

In particular embodiments of the present invention, the methods may further comprise the step of coating the produced pale-colored fiber cement products with a clear conventional coating and/or with a clear radiation-curable coating as described in detail herein.

In a third aspect, the present invention provides pale-colored fiber cement products obtainable by any of the methods according to the present invention.

In a fourth aspect, the present invention provides uses of the pale-colored fiber cement products according to the present invention as building materials.

In particular embodiments, the present invention provides uses of the pale-colored fiber cement products according to the present invention as an outer surface to walls, applied internally or externally, e.g. as façade plate, siding, etc. In other particular embodiments, the pale-colored fiber cement products according to the present invention can be used for decking or flooring applications, fencing applications and/or covering applications.

The invention will now be further illustrated in detail with reference to the following Examples.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Figure 1:
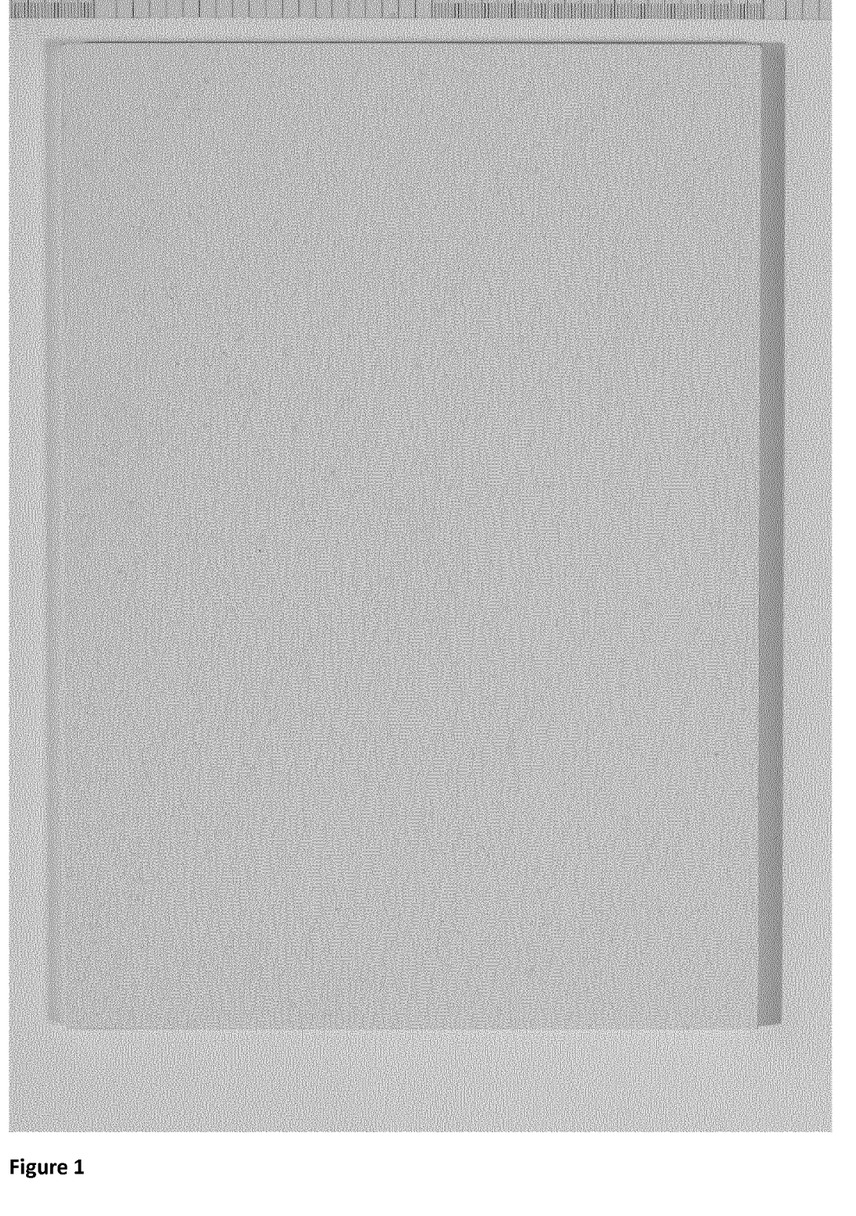
FIG. 1 is a full picture of the top surface of a pale-colored fiber cement product according to the present invention.
Figure 2:
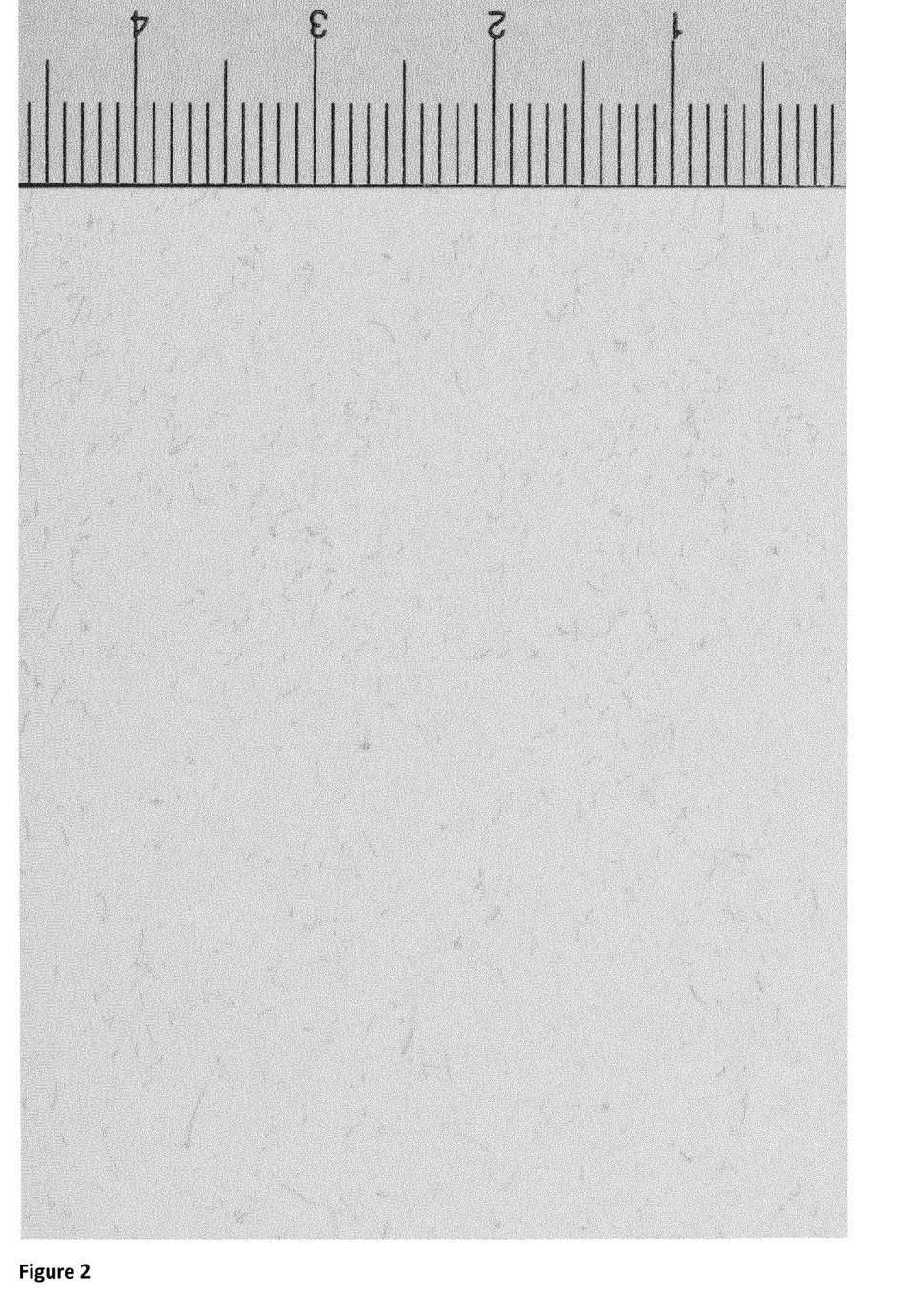
FIG. 2 is a detail picture of the top surface of a pale-colored fiber cement product according to the present invention.
Figure 3:
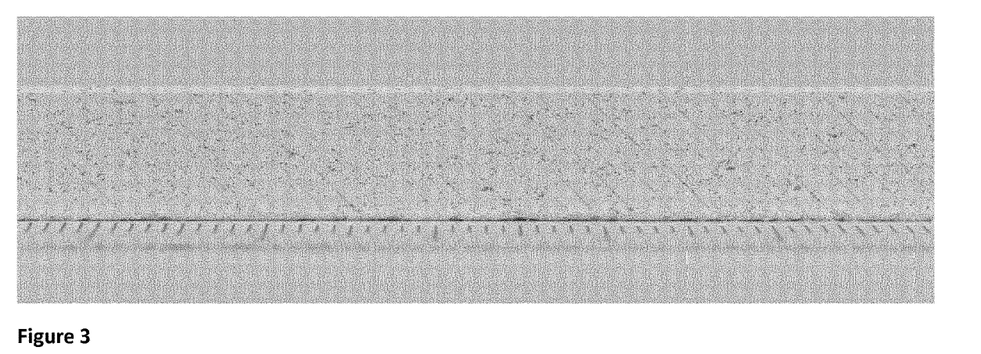
FIGS. 3 to 6 are full pictures of sections of pale-colored fiber cement products according to the present invention.
Figure 4:
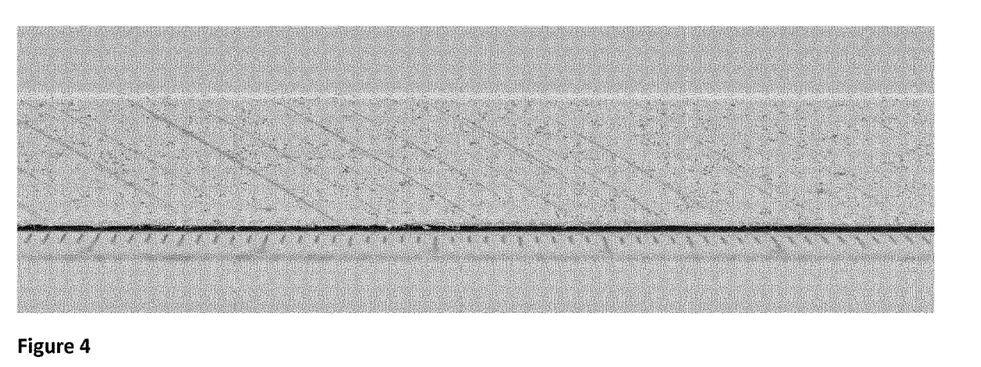
Figure 5:
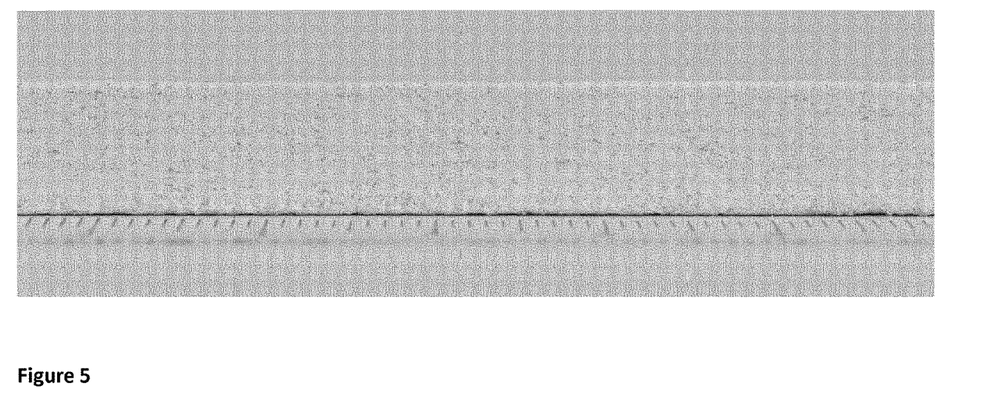
Figure 6:
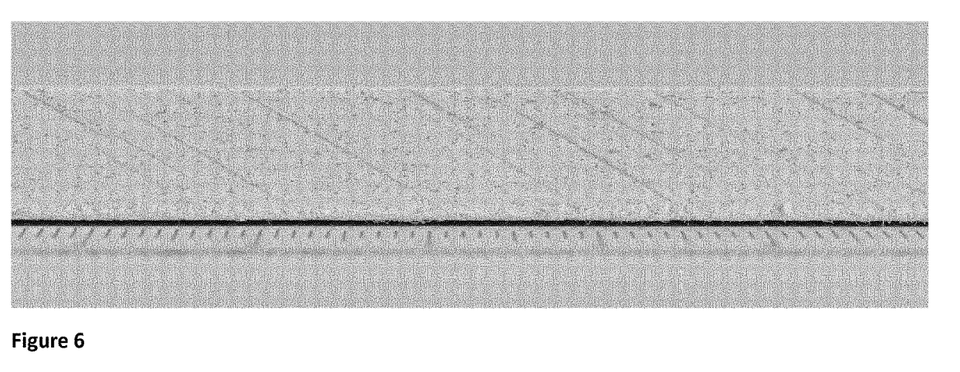

It will become clear from the experimental results as described below that the fiber cement products of the present invention are characterized by an attractive esthetic appearance because of their pale-colored aspect and their original surface pattern as achieved through the presence of the dark-pigmented synthetic fibers (as shown in FIGS. 1 to 6).

Example 1

Manufacture of Pale-Colored Fiber Cement Products According to the Present Invention Fiber cement products were produced with the methods of the present invention as described herein according to the following specific embodiments.

1.1 Materials & Methods
1.1.1 Production of Fiber Cement Slurry Samples

Formulations of an aqueous fiber cement slurry were prepared as shown in Table 1. Other additives may have been added to these formulations, without being essential to the findings of the present invention.

1.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets were pressed at 230 kg/cm² and air-cured by subjecting them to a curing at 60° C. for 8 hours, and thereafter curing at ambient conditions. After two weeks, half of the formed fiber cement products were left uncoated and half of the formed fiber cement products were coated with a conventional clear coating comprising 1-2% of $TiO_2$ in the top layer. All the resulting products were observed and photographed and reflectance measurements were done to determine the whiteness of the products.

TABLE 1

Fiber cement formulation of a pale-colored fiber cement product according to the present invention (PVA: polyvinyl alcohol; PP: polypropylene; Weight % refers to the mass of the component over the total mass of all components except free water, i.e. the dry matter.

| Ingredient | Dry weight (kg) | Weight % |
| --- | --- | --- |
| White cement | 769 | 76.9 |
| *Cellulose fibers | 28 | 2.8 |
| PVA fibers 8 dtex | 19 | 1.9 |
| White pigment | 46 | 4.6 |
| **Gray pigmented PP fibers 70 dtex | 19 | 1.9 |
| Limestone | 100 | 10 |
| Additives | 19 | 1.9 |

*Kraft softwood bleached cellulose
**PP synthetic fibers were pigmented with a gray pigment during production and milled afterwards. Milling of the PP fibers provided a length distribution of between about 0.2 mm and about 3 mm, with an average fiber length of between about 1 mm and about 2 mm. RGB color of the fibers was Red: 178; Green: 176; Blue: 170 (HEX code: B2 B0 AA).

1.2 Results

The whiteness of the produced uncoated pale-colored fiber cement product according to the invention, expressed as L*a*b L-value, was L*=87.98, a*=0.23, b*=4.48 (Cie-Lab).

The whiteness of the produced coated pale-colored fiber cement product according to the invention, expressed as L*a*b L-value, was L*=87.18, a*=0.05, b*=4.21 (Cie-Lab).

FIGS. 1 to 6 show that the surface of the fiber cement products of the present invention displays the texture and color of the core materials, which provides the products with a natural yet modern look. In particular, the pale-colored fiber cement products of the present invention expose the natural texture of both the cement (which is white-colored or pale-colored) and the synthetic fibers (which are dark-colored), creating an appealing contrast between both components.

The invention claimed is:

1. A pale-colored fiber cement product comprising white cement and previously-pigmented synthetic fibers, wherein the synthetic fibers are pigmented with at least one dark pigment chosen from the group consisting of a black pigment, a brown pigment, a blue pigment, a red pigment, a green pigment and a gray pigment.

2. The pale-colored fiber cement product according to claim 1, wherein said synthetic fibers are polypropylene fibers.

3. The pale-colored fiber cement product according to claim 1, wherein said synthetic fibers are polypropylene fibers having a thickness of 63 to 77 dtex.

4. The pale-colored fiber cement product according to claim 1, wherein said synthetic fibers are milled polypropylene fibers having an average length of 1 mm to 2 mm.

5. The pale-colored fiber cement product according to claim 1, wherein said synthetic fibers are pigmented with at least one dark pigment, which is a gray iron oxide, a black iron oxide, a brown iron oxide, or carbon black.

6. The pale-colored fiber cement product according to claim 1, which further comprises a white pigment.

7. The pale-colored fiber cement product according to claim 6, wherein said white pigment is titanium oxide (TiO2).

8. The pale-colored fiber cement product according to claim 6, wherein said white pigment is present in an amount of between 3 weight % and 6 weight % (compared to the total dry weight of the fiber cement composition) of said fiber cement product.

9. The pale-colored fiber cement product according to claim 1, which further comprises limestone (CaCO3) in an amount of between about 5 weight % and 15 weight % (compared to the total dry weight of the fiber cement composition of said fiber cement product).

10. The pale-colored fiber cement product according to claim 1, which is coated with a clear coating.

11. The pale-colored fiber cement product according to claim 10, wherein said clear coating comprises between 0.5 weight % to 4 weight % (compared to the total dry weight of the fiber cement composition of said fiber cement product) of a white pigment.

12. The pale-colored fiber cement product according to claim 11, wherein said white pigment is titanium oxide (TiO2).

13. A method for the manufacture of a pale-colored fiber cement product according to claim 1, comprising the steps of:
a) Providing a fiber cement slurry at least comprising white cement and synthetic fibers, which synthetic fibers are pigmented with at least one dark pigment chosen from the group consisting of a black pigment, a brown pigment and a gray pigment;
b) Manufacturing a fiber cement product by means of a fiber cement production process; and
c) Curing the fiber cement product, so as to obtain said pale-colored fiber cement product.

14. The method according to claim 13, wherein said step c) of curing the fiber cement product comprises air-curing the fiber cement product.

15. A building material comprising the pale-colored fiber cement product according to claim 1.

16. The pale-colored fiber cement product according to claim 1, wherein natural texture of both the cement and synthetic fibers is exposed, thus masking visibility of any defect or damage occurring in the product.

17. The pale-colored fiber cement product according to claim 1, wherein said synthetic fibers are milled fibers having an average length of 1 mm to 2 mm.

18. The pale-colored fiber cement product according to claim 1, comprising from 0.1 to 5 weight % of said synthetic fibers with respect to the total weight of the fiber cement product.

19. The pale-colored fiber cement product according to claim 18, comprising from 0.5 to 4 weight % of said synthetic fibers.

20. The pale-colored fiber cement product according to claim 19, comprising between 1 to 3 weight % of said synthetic fibers.

* * * * *